H. THUN.
SURFACE MEASURING DEVICE ESPECIALLY FOR LEATHER.
APPLICATION FILED OCT. 4, 1920.

1,429,803.

Patented Sept. 19, 1922.
2 SHEETS—SHEET 1.

Inventor.
Hermann Thun.
By Knight Bros.
Attys

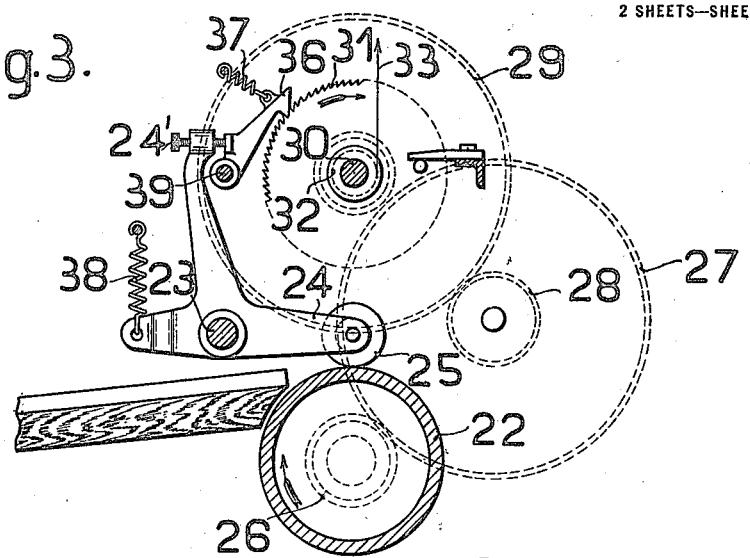
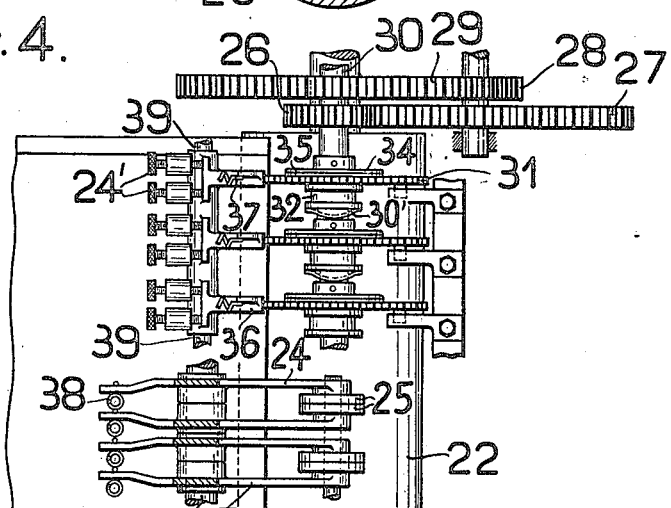
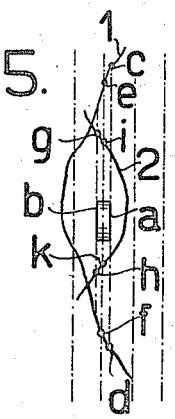

Patented Sept. 19, 1922.

1,429,803

UNITED STATES PATENT OFFICE.

HERMANN THUN, OF ESSEN, GERMANY, ASSIGNOR TO FRIED. KRUPP AKTIENGESELL-SCHAFT, OF ESSEN-ON-THE-RUHR, GERMANY.

SURFACE-MEASURING DEVICE ESPECIALLY FOR LEATHER.

Application filed October 4, 1920. Serial No. 414,694.

*To all whom it may concern:*

Be it known that I, HERMANN THUN, residing at Essen, Germany, a citizen of the German Republic, have invented a certain new and useful Improvement in Surface-Measuring Devices Especially for Leather, of which the following is a specification.

This invention relates to a surface measuring machine destined in particular for the measuring of pieces of leather. More especially, the invention refers to such machines of the kind specified in which the surfaces to be measured (say, of pieces of leather or the like) are divided by means of measuring wheels or feelers, arranged at equal distances from each other, in strips of equal width, and the length of these latter is measured, added, and the result marked on an indicating mechanism. Now in the case of these known types of measuring devices, the width of the measuring wheel itself causes an error which results in that the obtained amount of measurement is always indicated as larger than it actually is, and which error will be the bigger the broader the said wheels happen to be and the more the edges of the leather along which the measuring wheels travel up and down happen to lie in the direction in which the hides to be measured are caused to move.

The essential feature of this invention resides in the fact of the measuring wheels or feelers being arranged in twos at every point, so that always two measuring wheels disposed in juxtaposition will come to act on one measuring element in such wise that each part separately will be enabled to either discontinue or commence the measuring movement, so that this movement will only take place after both measuring wheels or feelers have been simultaneously lifted off from the leather. If the two measuring wheels are actually disposed so closely the one to the other that no intermediate space will remain between them, then this will be tantamount in effect to the action of a single measuring wheel having a breadth equalling zero at the point where the wheel sets form mutual contact.

An embodiment of the subject matter of this invention is shown by way of example in the accompanying drawing, in which:

Figs. 3 and 4 are an elevation and plan view, respectively, showing the application of the invention to a measuring machine in the case of which feelers travelling continuously along the measuring roller are adapted to couple the rollers, serving to wind up the measuring bands, to a shaft driven by the measuring roller, when these rollers are lifted by the leather.

Fig. 5 is a diagrammatic view showing how the error in width is caused in the case of an ordinary measuring wheel or feeler.

Fig. 6 is a similar view showing how the error in width may be avoided by the arrangement of double measuring wheels in accordance with this invention.

Figure 1:
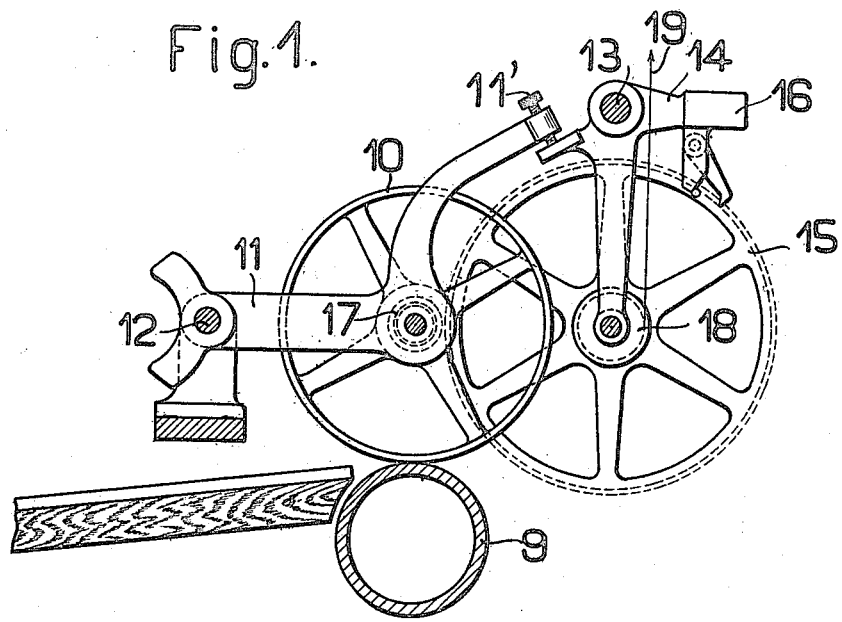
Figs. 1 and 2 are an elevation and plan view, respectively, showing the application of the invention to measuring machines in the case of which measuring wheels travelling continuously along the measuring roller are adapted to transfer their motion by means of drivers, mounted coaxially on said wheels, on to segments and therewith on to the different measuring bands.
Figure 2:
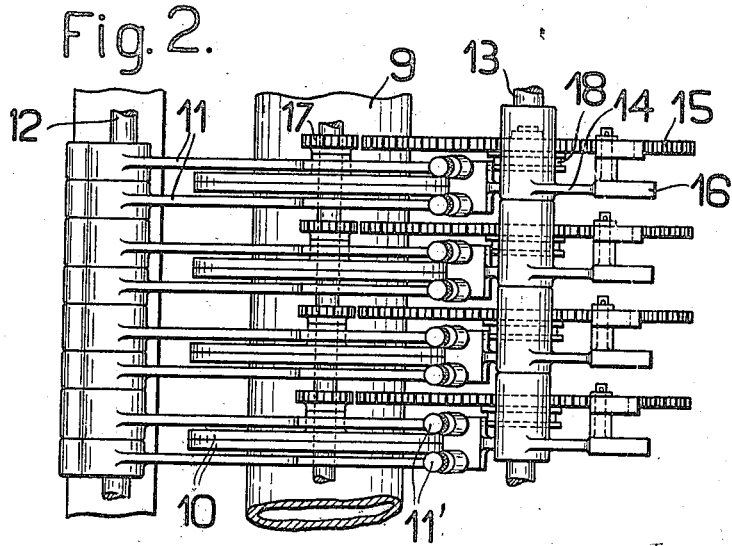

Referring to the construction shown in Figs. 1 and 2, on the measuring roller 9 there are arranged to travel continuously the measuring wheels 10 fixed so as to rotate on the levers 11 mounted on the shaft 12. When raised by the leather the said wheels afford the segment levers 14, which are lodged on the shaft 13, the possibility to shift to the left under the action of the weight 16, and to cause the wheel 15 to engage the drivers 17 which continuously take part of the rotation of the measuring wheels 10. By these means the said wheels 15 are caused to turn to the right, and the rollers 18 connected to them to wind up the measuring bands 19 in the known manner and to transfer this motion on to the adding device. The lever ratio is such and the conditions thereof are so choosen that the wheels 15 will be brought into engagement with the drivers 17 even in the case of very thin leather to be measured. The measuring wheels 10 are now always arranged in pairs, as are also the levers 11 with the set screws 11' acting on the lever 14, so that there are provided always two measuring wheels 10 with levers 11 and set screws 11' for each wheel 15 and each driver 17 rigidly connected to one of said two measuring wheels 10. Only after both measuring wheels 10, and therewith both levers 11, have been raised, does the wheel 15 enter into engagement with the respective driver 17.

Figs. 3 and 4 illustrate the application of the subject matter of this invention to a different system of measuring machine. In the place of the measuring wheels there are adapted to travel rollers 25, on rollers 22, having the nature of feelers, which are disposed to rotate on the levers 24 mounted on the shaft 23. The feelers 25 are not intended to transfer the measuring movement itself, but are merely destined to connect and disconnect it while they are being raised or lowered by the leather as it passes underneath. The measuring roller 22 serves to permanently drive the shaft 30 by the intervention of the wheel sets 26, 27 and 28, 29. On this said shaft 30 there are mounted the wheels 31 which are merely connected thereto by friction. Springs 30' (Fig. 4) are adapted to force said wheels 31 against leather washers 35 bearing up against discs 34 fixed to the shaft 30. As a rule, the wheels 31 are prevented from following the rotation of the shaft 30 by means of pawls 36. The spring 37 tends to withdraw the said pawl 36 from out of the wheels 31, but is prevented herein by the screw 24' disposed at the upright arm of the lever 24 and bearing up against the pawl 36 under the action of a strong spring 38. On the feeler being raised by the leather, then the pawl 36 is released, and the wheel 31 follows the rotation of the shaft 30. A roller 32 rigidly connected to the wheel 31, then is winding up the measuring band 33 which motion is transferred on to the adding device. Now, according to this invention, the rollers 25, the levers 24, the set screws 24', and the springs 38 are arranged in pairs for each wheel 31. The pawl 36 is only released, or, in other words, the measuring movement is only put in operation, after both feeler rollers 25 have been simultaneously raised by the leather to be measured.

If, as shown in Fig. 4, the two rollers 25 are arranged so as to be in juxtaposition, then the error in width will be entirely avoided.

In Fig. 5 there is shown how the error in width is produced in the case of a measuring wheel of customary type. If the leather edge 1 happens to move in the direction indicated by the arrow underneath the measuring wheel, then the measuring movement is started as soon as the edge $a$ of the roller encounters the edge 1 of the leather at $c$, and comes to a stop the instant the edge $a$ departs from the edge 1 at $d$. As a matter of fact, however, the measuring movement ought to start at the point $e$ and end at the point $f$. Hence, the result of the measurement obtained in this way is therefore by so much larger as the line $c$—$d$ exceeds the line $e$—$f$. In the case of a second leather edge 2, the measuring motion sets in when the roller edge $b$ encounters the leather edge at $g$, and ends as soon as the roller edge $b$ departs from the leather edge 2 at $h$. The error in width in this case equals the difference prevailing between the lines $g$—$h$ and $i$—$k$.

Fig. 6 embodies a diagram showing how the said error is avoided in accordance with this invention. The roller 3 is raised at point 5 and the roller 4 at point 6 of the leather edge. The measuring operation thus sets in at 6, because from this point onward both rollers are raised. Roller 3 departs from the leather edge at 8, and roller 4 at 7. However, the measuring operation has already come to a stop at point 7 because from this point onward only one roller is raised. Hence, it is not the line 5—8, but 6—7, which is actually measured, as it must be done if an error in width is to be avoided.

In the claim, either the measuring wheels 10 or feelers 25 or their equivalents are intended to be included in the term "measuring members."

Claims:

1. In a middle length measuring machine for strips with oblique ends, two strip contacting roller means having their rollers side by side for said strip, a work train for an instrument and a coupling between said first named means and said train normally held disengagingly and independently by either of said roller means.

2. A surface measuring machine comprising a measuring element, operative means for actuating an instrument, and a dual control means for said operative means, said dual control comprising independent means conjointly operative by the two halves of said measuring element, whereby the movement of said actuating means will only take place when the whole of said measuring element contacts with the work to be measured.

3. In a middle length measuring machine for strips with oblique ends, an indicating mechanism, plural means for operating said indicating mechanism, two control bodies provided for each of said plural means, said bodies being independent of each other and operated by the work to be measured, said control bodies causing said means to operate the indicating mechanism, only when both control bodies are in contact with the work to be measured.

The foregoing specification signed at Essen, Germany, this 15th day of June, 1920.

HERMANN THUN.

In presence of—
   HANS GOTTSMANN,
   JOHANN DECKERS.